United States Patent
Shah et al.

(10) Patent No.: US 8,463,969 B2
(45) Date of Patent: Jun. 11, 2013

(54) EXTENDED MESSAGE SIGNAL INTERRUPT

(75) Inventors: Shrikant M. Shah, Chandler, AZ (US); Peter C. Brink, Tempe, AZ (US); Peter Munguia, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1486 days.

(21) Appl. No.: 11/171,862

(22) Filed: Jun. 30, 2005

(65) Prior Publication Data

US 2007/0005858 A1    Jan. 4, 2007

(51) Int. Cl.
*G06F 12/00* (2006.01)

(52) U.S. Cl.
USPC ............................ 710/200; 710/240; 710/260

(58) Field of Classification Search
USPC ........................... 710/260–269, 200, 240–244
See application file for complete search history.

(56) References Cited

U.S. PATENT DOCUMENTS

| | | | | |
|---|---|---|---|---|
| 5,771,374 A | * | 6/1998 | Burshtein et al. | 713/502 |
| 5,960,212 A | * | 9/1999 | Mak | 712/34 |
| 2001/0032287 A1 | * | 10/2001 | Lai et al. | 710/260 |
| 2005/0138255 A1 | * | 6/2005 | Moyer et al. | 710/260 |
| 2005/0228922 A1 | * | 10/2005 | Tsao et al. | 710/268 |

* cited by examiner

*Primary Examiner* — Brian Misiura
*Assistant Examiner* — Kim Huynh
(74) *Attorney, Agent, or Firm* — Schubert Law Group PLLC

(57) ABSTRACT

Methods and arrangements to extend message signal interrupt (MSI) transactions with additional data to reduce the latency associated with servicing interrupts included in the transactions are contemplated. Some embodiments may comprise a chipset that transmits the MSI to a processor to service the interrupt. The chipset may identify that a transaction is an extended MSI transaction by determining that the MSI has more than a four bytes. In several embodiments, the chipset may validate the MSI by determining that the MSI comprises at least six bytes and, in further embodiments, by determining that the extended MSI has a valid signature byte. Another embodiment comprises a processor to receive the extended MSI transaction and store the data to service the corresponding interrupt(s) in a low latency buffer. The processor may then service the interrupt(s) based upon the data when the processor becomes available.

28 Claims, 6 Drawing Sheets

EXTENDED MESSAGE SIGNAL INTERRUPT

FIELD

The present invention is in the field of interrupt processing. More particularly, the present invention relates to methods and arrangements to extend message signal interrupt (MSI) transactions with additional data to reduce the latency associated with servicing the interrupts indicated by the transactions. Further embodiments provide backward compatibility for double word MSIs.

BACKGROUND

As generations of processors and chipsets are scaled down to increase functionality and speed available in chip packages, designers must continually scale down cell structures to smaller and smaller dimensions to increase the density of cells per area of the substrate. In fact, the scaling theory predicts that processor sizes will decrease by half in each generation so a 50% area scalar is a goal when designing a smaller technology generation of integrated circuits. This persistent drive to scale processors and chipsets while increasing performance is pressuring designers to minimize pin count.

One current solution for reducing the pin count is to remove the interrupt pin(s) and request an interrupt service via a Message Signaled Interrupt (MSI) transaction. The MSI transaction is introduced in the Peripheral Components Interconnect (PCI) Local Bus Specifications [PCI Local Bus Specification, Revision 2.2, Dec. 18, 1998 available from the PCI Special Interest Group, Portland, Oreg., U.S.A, http://www.pcisig.com/] as an optional feature for PCI devices and a required feature for PCI Express (PCI-E) devices [PCI Express Base Specification, Revision 1.0a, Apr. 15, 2003 available from the PCI Special Interest Group, Portland, Oreg., U.S.A, http://www.pcisig.com/]. An MSI transaction enables a PCI device function to request an interrupt service by sending the MSI transaction as an inbound memory write on its PCI bus to the front-side bus (FSB). Because an MSI transaction is generated in the form of a memory write, MSI transactions support transaction conditions such as a retry, master-abort, target-abort or normal completion. As added benefits, MSI transactions simplify board design by removing out of band interrupt routing and represent another step towards a legacy-free environment.

A significant drawback of MSI transactions is the latency involved with servicing an interrupt. For instance, when a PCI, PCI Extended (PCI-X) [PCI-X Addendum to the PCI Local Bus Specification, Revision 1.0, Sep. 22, 1999 available from the PCI Special Interest Group, Portland, Oreg., U.S.A, http://www.pcisig.com/], or PCI-E device requests an interrupt service using MSI, the device generates a MSI transaction, which is a double word (DWORD) including a system-specified message and a system-specified address. Once a processor receives the MSI transaction, the processor must transmit a request to the requesting device function to retrieve data required to service the interrupt. The processor may then service the interrupt upon receipt of a response from the PCI device. However, the latency involved with transmitting a message back to the PCI device and receiving the response from the PCI device is relatively long. Thus, each interrupt serviced via a MSI transaction involves a long latency and adds traffic to, e.g., the FSB, memory controller hub (MCH), and, in some cases, the input-output controller hub (ICH).

BRIEF DESCRIPTION OF THE DRAWINGS

Advantages of embodiments of the invention will become apparent upon reading the following detailed description and upon reference to the accompanying drawings in which like references may indicate similar elements.

DETAILED DESCRIPTION OF EMBODIMENTS

Figure 1:
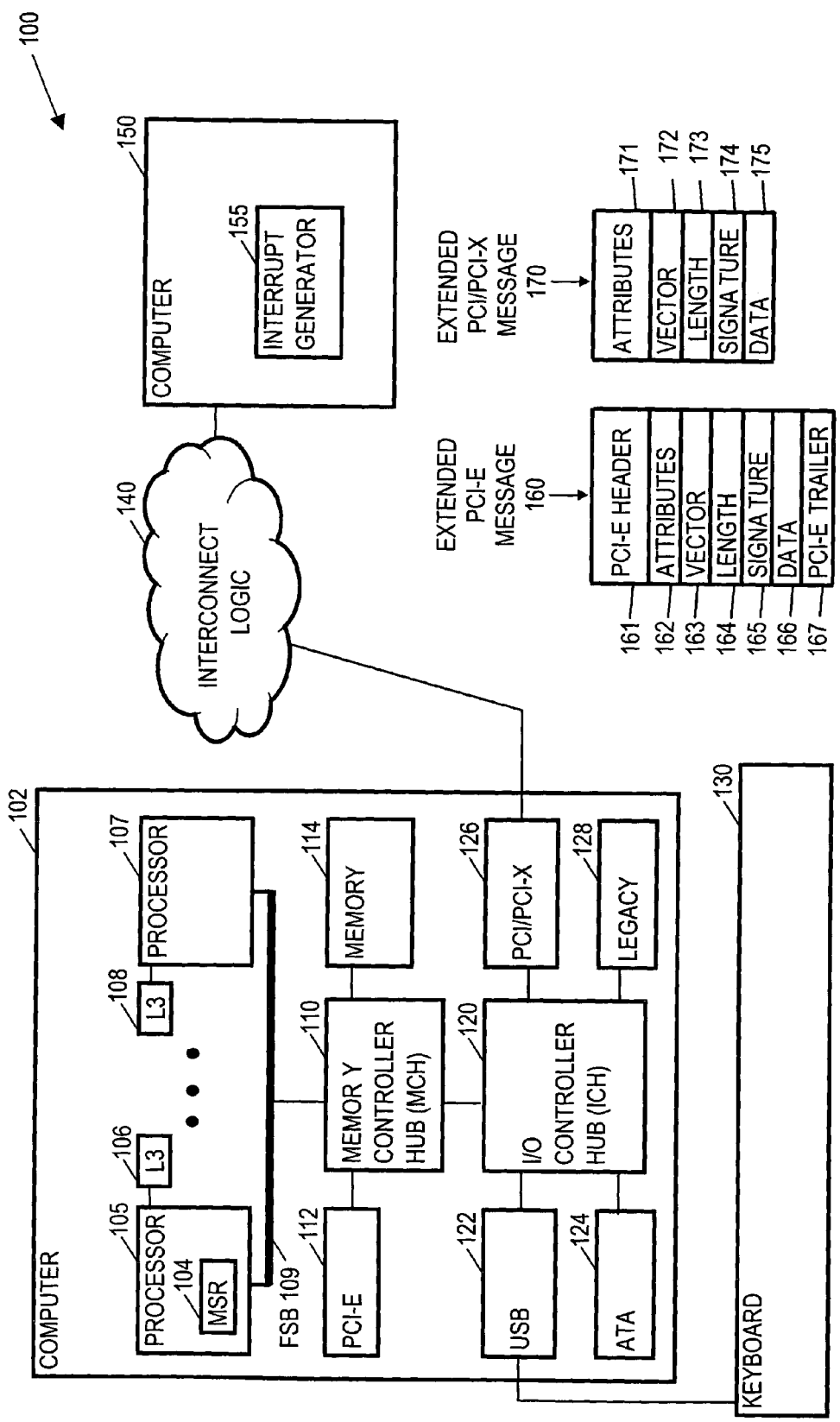
FIG. 1 depicts an embodiment of a system including a computer that is designed to service extended MSI transactions from PCI compliant buses.

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to extend message signal interrupt (MSI) transactions with additional data to reduce the latency associated with servicing interrupts represented by the transactions are contemplated. Some embodiments may comprise a chipset that transmits the MSI transaction to a processor to service the interrupt associated with the MSI transaction. The chipset may identify that the MSI transaction is an extended MSI transaction by determining that the MSI transaction has more than a four bytes. In several embodiments, the chipset may validate the extended MSI transaction by determining that the extended MSI transaction comprises, e.g., at least six bytes and, in further embodiments, by determining that the extended MSI transaction has a valid signature byte.

Another embodiment comprises a processor to receive the extended MSI transaction and service the interrupt(s) indicated by the extended MSI transaction. Upon receipt of the extended MSI transaction, the processor may identify the MSI transaction as an extended MSI transaction. The processor may then verify that the extended MSI transaction is valid and, in response to determining that the extended MSI transaction is valid, store the data to service the interrupt(s) in a low latency buffer. The processor may also store an indication of the extended MSI transaction in an interrupt queue along with an address and/or offset for the data to service the interrupt. In many situations, when ready to service the interrupt, the processor can read the data and service the interrupt without further communication with the device that requested the interrupt, advantageously avoiding latencies involved with further communications with that device. For instance, if the originating device is a keyboard, data designating the keystroke may be transmitted in the MSI transaction to a processor for service. As a result, the processor need not request the keystroke from the keyboard, which is a relatively long latency, to service the interrupt.

While portions of the following detailed discussion describes the invention in terms of PCI buses and PCI devices, embodiments may implemented on any bus configuration or communications protocol that implements MSI, MSI-X, or similar transactions. Further, while current implementations specify an MSI transaction in the format of a write transaction, other types of transactions that allow the interrupt to be routed via the MCH and/or ICH to the processor are contemplated.

Turning now to the drawings, FIG. 1 depicts an embodiment of a system 100 including a computer 102 coupled with a computer 150 via a interconnect logic 140. Computer 102 is adapted to act as a fail-over system for computer 150. In particular, if computer 150 has a failure such as a system-wide failure that causes computer 150 to go off line or power down, computer 102 automatically takes over the functionality offered by computer 150. To assure that computer 102 recognizes when computer 150 fails, computer 150 comprises an interrupt generator 155 that generates a heartbeat signal. The heartbeat signal is a status signal, or transaction, that is transmitted to computer 102 via interconnect logic 140 to describe the health status of computer 150.

Interconnect logic 140 is a mechanism including hardware, firmware, software, state machines, and/or other logic for connecting computer 102 and computer 150 to facilitate communications such as heartbeat signal. For example, interconnect logic 140 may be a PCI compliant to PCI compliant bridge or switch.

Computer 102 receives the heartbeat signal from computer 150 at PCI/PCI-X 126 and transmits the heartbeat signal including the status information as an extended MSI transaction to an operating system (OS) designated processor such as processor 105 or 107 on the FSB 109. The extended MSI transaction may be, e.g., an extended PCI/PCI-X message 170. PCI/PCI-X 126 may comprise one or more host controllers, each capable of controlling one or more PCI or PCI-X agents. PCI agents may be, e.g., hot swappable PCI cards connected to devices such as other computers, hard drives, Ethernet networks, fiber-optic networks, wireless networks, and the like.

Extended PCI/PCI-X message 170 comprises attributes 171, a vector 172, a length 173, a signature 174, and data 175. Attributes 171 may be two bytes in length and may describe the number and type of interrupt that is included in extended PCI/PCI-X message 170, which are both assigned by the OS. Vector 172 comprises an address designated by the OS to identify the transaction, which otherwise appears to be a write transaction, as an MSI transaction. Length 173 may be one byte and may describe the length of data 175. For example, length 173 may identify the amount of data 175 included in the heartbeat signal to describe the health of computer 150. Signature 174 may comprise data to be utilized to validate extended PCI/PCI-X message 170 as a valid extended MSI transaction. And data 175 may be the data included in the heartbeat to describe the health of computer 150.

In some embodiments, data 175 may be up to 58 bytes in length. In such embodiments, the total length of the extended MSI transaction is advantageously multiple of number of bytes transferred per FSB 109 clock to efficiently utilize the FSB 109 to transfer the extended MSI transaction to a processor. In further embodiments, data 175 may be a different length and the extended MSI transaction may or may not utilize the all the bytes per FSB 109 clock.

Once the heartbeat signal is received in form of an extended MSI transaction, PCI/PCI-X 126 transfers the extended MSI transaction to ICH 120 in the form of one or more packets. ICH 120 is adapted to receive inbound transactions from a variety of I/O devices, route the inbound transactions upbound to processors 105 and 107 via MCHI 110, and route outbound transactions received via MCHI 110 to the corresponding I/O devices.

ICH 120 may be an I/O controller hub such as INTEL's™ 82801FR (ICH6R) controller hub with extended MSI capabilities. ICH 120 may comprise an interrupt controller and a queue to organize and route extended MSI transactions to MCH 110. The extended MSI transactions may be received from PCI/PCI-X 126 such as the heartbeat signals or from other I/O interfaces such as universal serial bus (USB) 122, AT attachment (ATA) 124, and/or legacy 128. USB 122 may comprise, e.g., eight high-speed USB 2.0 ports, which are backwards compatible to process USB 1.1 communications. USB 122 may handle up to 60 MegaBytes (MB) per second of data transfer from USB devices such as a keyboard 130 or other devices like a mouse, a hard drive, an optical drive, a floppy disk drive, a tape drive, and the like. For instance, USB 122 may generate an extended MSI transaction in response to a keystroke on keyboard 130. The extended MSI transaction may include data indicative of the key or keys pressed and USB 122 may transmit the extended MSI message to ICH 120. In other embodiments, ICH 120 may receive an indication of the keystroke from USB 122 and create an extended MSI transaction that includes the data indicative of the keys.

ATA 124 may comprise, for example, four serial ports capable of transmitting up to 150 MB per second between ICH 120 and ATA devices. And legacy 128 may comprise one or more controllers to facilitate communications with legacy devices such as ATA-100 devices. Legacy 128 may be capable of bandwidths up to 100 MB per second.

In some embodiments, ICH 120 comprises a queue to handle messages having sizes up to 64 bytes like message 170. The queue may be a first in, first out (FIFO) queue adapted to transmit extended MSI transactions to MCHI 110 in the order received. In further embodiments, ICH may comprise more than one queues and associate extended MSI transactions with the queues based upon a priority associated with the transactions. In other embodiments, ICH 120 may otherwise allow higher priority extended MSI transactions to bypass lower priority MSI transactions. For instance, ICH 122 may allow a message comprising the heartbeat signal from computer 150 to bypass a message comprising a keystroke from keyboard 130 based upon a higher priority associated with the heartbeat signal.

In other embodiments, ICH 120 may comprise one or more queues for ordering extended MSI transactions and a buffer to hold, e.g., 60 bytes of data associated with the extended MSI transactions. For instance, upon receipt of the heartbeat signal as an extended PCI/PCI-X message 170, ICH may store attributes 171 and vector 172 in an ordering queue for MSI transactions regardless of whether these transactions are extended MSI transactions or legacy MSI transactions. For extended MSI transactions, ICH 120 may store length 173, signature 174, and data 175 in a pending extended MSI transaction buffer and associate each entry in the buffer with the corresponding MSI transaction in the interrupt ordering queues. Then, when an extended MSI transaction is to be forwarded to MCH 110, ICH 120 may re-attach length 173, signature 174, and data 175 to the extended MSI transaction.

MCH 110 may be a memory controller hub such as INTEL's™ E7221 memory controller hub with extended MSI capabilities. MCH 110 may also be referred to as a graphics and memory controller hub (GMCH) due to enhanced capabilities related to handling high-bandwidth graphics communications such as communications from a graphics accelerator card. Many embodiments of MCH 110 comprise direct memory access (DMA) capabilities, which facilitate direct access to a portion of memory 114 allocated to a graphics accelerator card. Memory 114 may, for instance, comprise double data rate (DDR), synchronous dynamic random access memory (SDRAM) and MCH 110 may facilitate, e.g., up to 8.5 GigaBytes (GB) per second access to memory 114.

MCH 110 is adapted to receive and act as a host bridge for extended MSI transactions received via ICH 120 and PCI-E 112. In some embodiments, for example, the heartbeat signal from computer 150 and/or other computers may be received at PCI-E 112 in the form of an extended MSI transaction such as extended PCI-E message 160. PCI-E 112 then routes the transaction via MCHI 110 to an OS designated processor on the FSB 109 to service the interrupt associated with the transaction.

Extended MSI transactions at PCI-E 112 may be substantially similar to the extended MSI transactions at PCI/PCI-X 126. In the present embodiment, extended PCI-E message 160 comprises a PCI-E header 161 and a PCI-E trailer 167, in addition to attributes 162, a vector 163, a length 164, a signature 165, and data 166, which, in this case, include the same data as attributes 171, a vector 172, a length 173, a signature 174, and data 175. PCI-E header 161 and PCI-E trailer 167 comprise transaction layer data to route extended PCI-E message 160 across a PCI-E bus.

MCH 110 may comprise one or more interrupt ordering queues and, in some embodiments, a pending interrupt data buffer to maintain the extended MSI transaction until the transaction is transmitted to the OS designated processor. MCH 110 may also comprise a priority handler to allow higher priority extended MSI transactions to bypass lower priority extended MSI transactions. In further embodiments, all extended MSI transactions may have the same priority and MCH 110 may transmit the extended MSI transactions upbound to the processors 105 and 107 in the same order the transactions are received.

In several embodiments, the OS designated processor is a physical processor and MCH 110 may transmit extended MSI transactions upbound substantially in parallel. In such embodiments, a bus arbiter for FSB 109 may coordinate transmission across FSB 109 according to availability of the processors. For instance, the OS may designate physical processors 105 or 107 based upon the type of MSIs, the origin of the MSI, and/or some other selection scheme.

In further embodiments, the OS may designate a logical processor for extended MSI transactions. In some of these embodiments, the logical processor designation may be associated with a priority for types of MSIs based upon a priority associated with the MSI or other method. For example, a higher priority MSI may be assigned a logical processor designation that guarantees a certain, higher quality of service than an extended MSI transaction assigned a lower priority logical processor designation. The logical processor may then transmit the extended MSI transaction to the first physical processor available to service the extended MSI transaction.

In alternative embodiments, MCH 110 may transmit the, e.g., attributes 171 and vector 172 of an extended MSI transaction to processor 105 and store length 173, signature 174, and data 175 in memory having a relatively low access latency with respect to requesting data 175 from the device that originated the extended MSI transaction. For instance, MCH 110 may store data 175 in memory 114 or in memory with a lower access latency than memory 114.

FSB 109 may be a front-side bus for processors 105 and 107 of computer 102. FSB 109 may comprise a bus arbiter to coordinate transmission of transactions on FSB 109. In particular, the bus arbiter may retrieve extended MSI transactions from MCH 110 based upon availability of processors associated with the transactions and the availability of bandwidth on FSB 109 to transmit the transactions to the processors 105 and 107.

Processors 105 and 107 represent two or more processors. In other embodiments, computer 102 may comprise a single processor rather than multiple processors. Processors 105 and 107 may be, for example, INTEL™ PENTIUMTM™4 processors that include extended MSI capabilities. More specifically, processors 105 and 107 may comprise logic to receive and service extended MSI transactions. The logic may be hardware, firmware, software such as an OS driver, and/or some combination thereof. For example, upon receipt of an extended MSI transaction, processors 105 and 107 may store data such as data 166 and 175 in a buffer allocated for extended MSI transactions. The buffer may be internal and/or external to the processor such as allocations of cache lines from one or more levels of cache like level three caches 106 and 108. The buffer may offer relatively low latency access to the data with respect to requesting the data from the device that originated the extended MSI transaction. For instance, upon receipt of an extended MSI transaction comprising a heartbeat signal from computer 150, processor 105 may store the attributes 171 and vector 172 in an interrupt servicing queue and the data 175 in a dedicated low latency buffer. When servicing the extended MSI interrupt, processor 105 may retrieve data 175 indirectly through Model-Specific Register (MSR) 104 to service the interrupt. In further embodiments, processor 105 may store data 175 in a level of cache, SDRAM, or other memory substantially closer to processor 105 than computer 150. In such cases, processor 105 may retrieve data 175 using normal memory addressing.

In some embodiments, data 166 and 175 may include a compilation or table of data for more than one interrupt compiled by a host controller such as PCI/PCI-X 126, ICH 120, MCH 110, PCI-E 112, or other controller, into a single extended MSI transaction. In such embodiments, processors 105 and 107 may interpret data 166 and 175 as multiple interrupts, advantageously increasing the number of interrupts that may be pending for service and increasing the number of pending interrupts that may be received from, e.g., I/O devices.

In other embodiments, data 166 and 175 may comprise other information for the processor so an extended MSI transaction may accomplish other functionality. Logic embodied in, e.g., an OS driver, firmware, a state machine, read only memory, or the like may interpret the data 166 and 175 to facilitate utilization of the other information to accomplish the other functionality.

Figure 2:
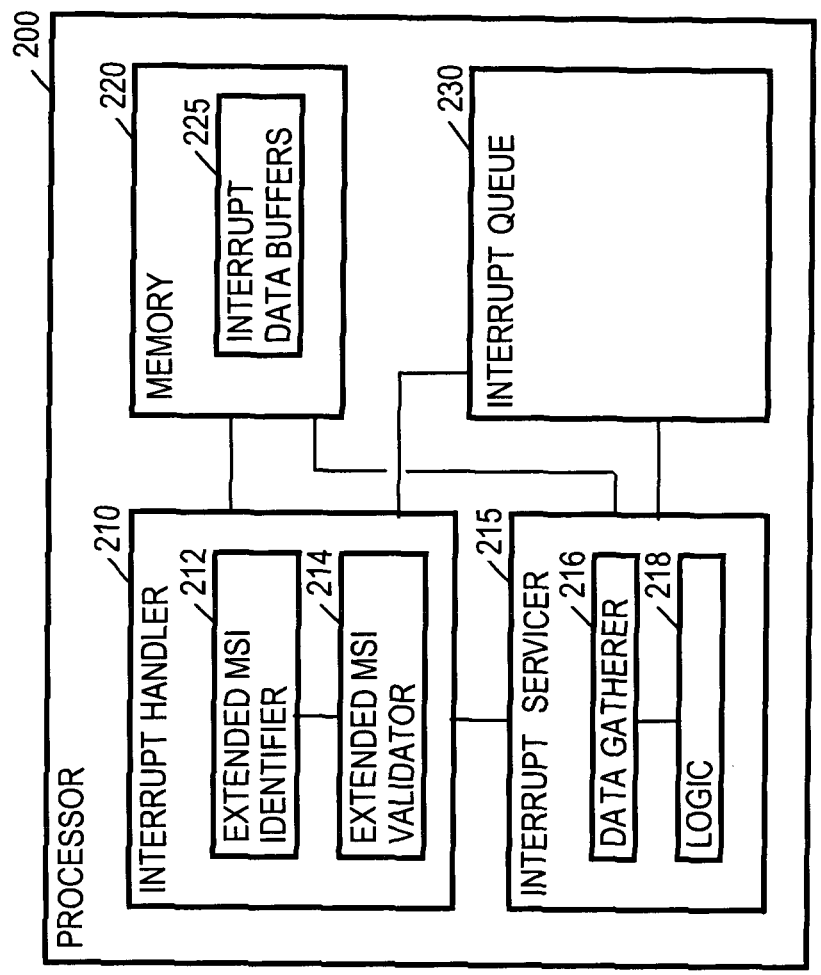
FIG. 2 depicts an embodiment of a processor with an interrupt handler and an interrupt servicer to process extended MSI transactions such as the processors in FIG. 1.

FIG. 2 illustrates an embodiment of a processor 200 such as processors 105 and 107, which may identify a transaction as an extended MSI transaction to process messages such as messages 160 and 170 of FIG. 1. More specifically, processor 200 comprises an interrupt handler 210, an interrupt servicer 215, a memory 220, and an interrupt queue 230. Interrupt handler 210 may comprise hardware, software, firmware, a state machine, and/or other logic to implement functionality in processor 200. Interrupt handler 210 may receive an extended MSI transaction from a chipset and, upon receipt of the extended MSI transaction, store data associated with the transaction such as data 175 in memory 220 and store interrupt information such as attributes 171 in interrupt queue 230.

Interrupt handler 210 comprises an extended MSI identifier 212 and an extended MSI validator 214. Extended MSI identifier 212 may identify extended MSI transactions from incoming MSI transactions. For instance, processor 200 may receive both legacy MSI transactions and extended MSI transactions. After receiving a MSI transaction, extended MSI identifier 212 may determine whether the transaction comprises more than a DWORD (four bytes). If the transaction is only four bytes, the transaction is a legacy MSI transaction and interrupt handler 210 may store the transaction in interrupt queue 230. In some embodiments, interrupt handler 210 may simultaneously transmit a request for data associated with the transaction to the device that originated the transaction to obtain data to service the MSI.

On the other hand, if the transaction is greater than four bytes, the transaction may be an extended MSI transaction, an invalid transaction, or other type of transaction. In response to the transaction being greater than four bytes, extended MSI validator 214 may determine whether the transaction has at least six bytes. If the transaction is at least six bytes in length, extended MSI validator 214 may determine that the transaction is a valid extended MSI transaction. In further embodiments, extended MSI validator 214 may determine whether a signature byte such as signature 174 of FIG. 1 identifies the transaction as a valid extended MSI transaction.

Once the extended MSI transaction is identified and validated, interrupt handler 210 parses the transaction to store the data and, in some embodiments, the entire transaction in memory 220. For example, in some embodiments, interrupt handler 210 may store an offset or memory address for an extended MSI transaction in interrupt queue 230 and the data in interrupt data buffers 225.

Then, when processor 200 is ready to service the transaction, interrupt servicer 215 may service the interrupt represented by the extended MSI transaction. Interrupt servicer 215 may comprise hardware, software such as an OS driver, firmware, a state machine, a specific-purpose processor core or controller, and/or other logic to implement functionality in processor 200.

Interrupt servicer 215 may comprise a data gatherer 216 and logic 218. Data gatherer 216 may obtain the portion of the transaction that resides in memory 220. Logic 218 interprets the content of data such as data 175 in the extended PCI/PCI-X message 170 of FIG. 1. For instance, logic 218 may recognize the data for a keystroke from a keyboard as such based upon the content of the data, characteristics of the extended MSI transaction, and/or information provided to logic 218 by other means.

Memory 220 may comprise a random access memory, flash memory, cache, or the like. Memory 220 comprises interrupt data buffers 225, which is a portion of memory that may be allocated for storage of the data from the extended MSI transaction and, in some embodiments, the entire transaction. Interrupt data buffers 225 may be directly or indirectly addressable through model-specific registers such as MSR 104 of processor 105, which is illustrated in FIG. 1. For instance, interrupt data buffers 225 may comprise an allocation of one or more cache lines in a level three (L3) cache. In other embodiments, memory 220 may be external to processor 200.

Figure 3A:
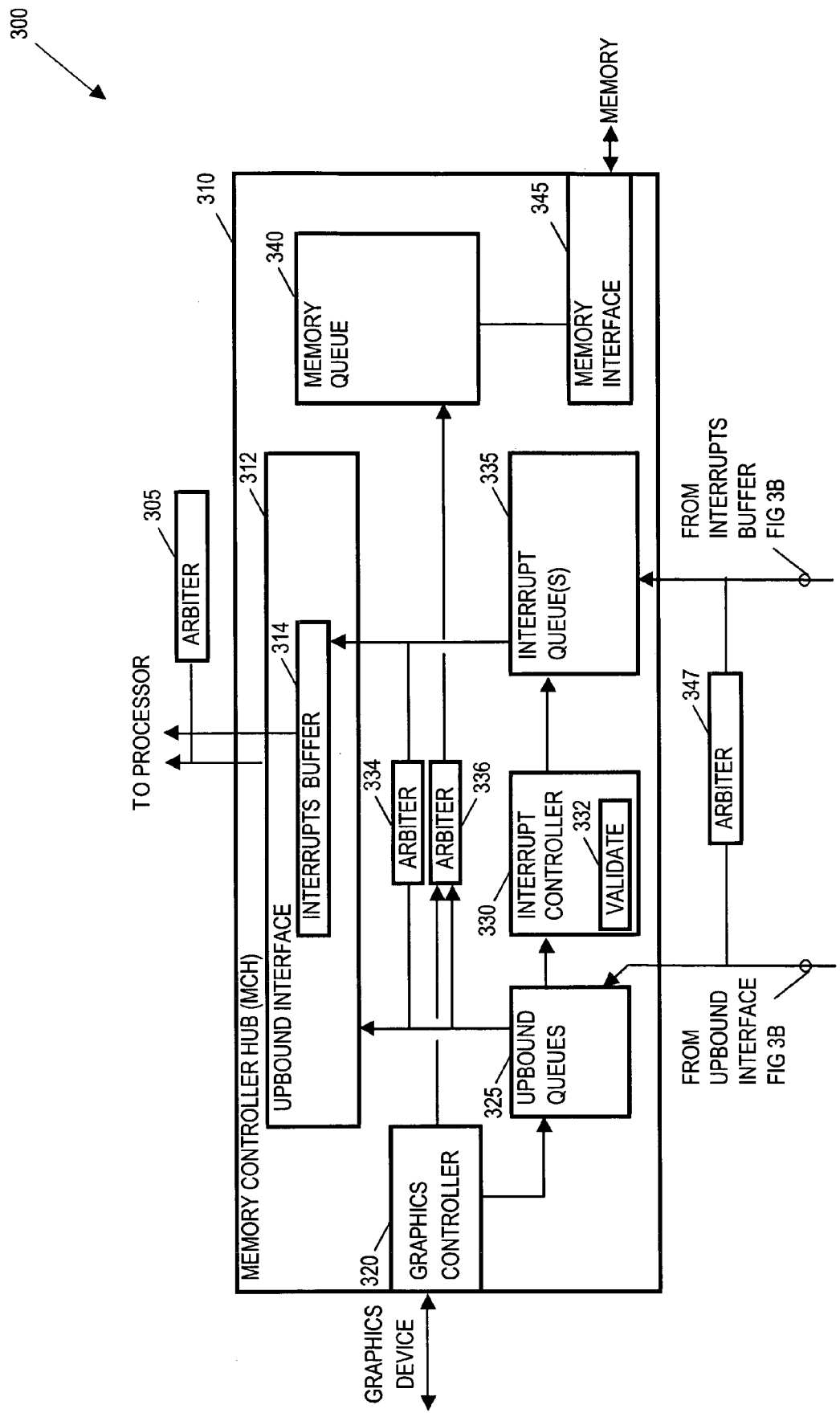
FIG. 3 depicts an embodiment of a chipset adapted to transmit an extended MSI transaction to a processor.
Figure 3B:
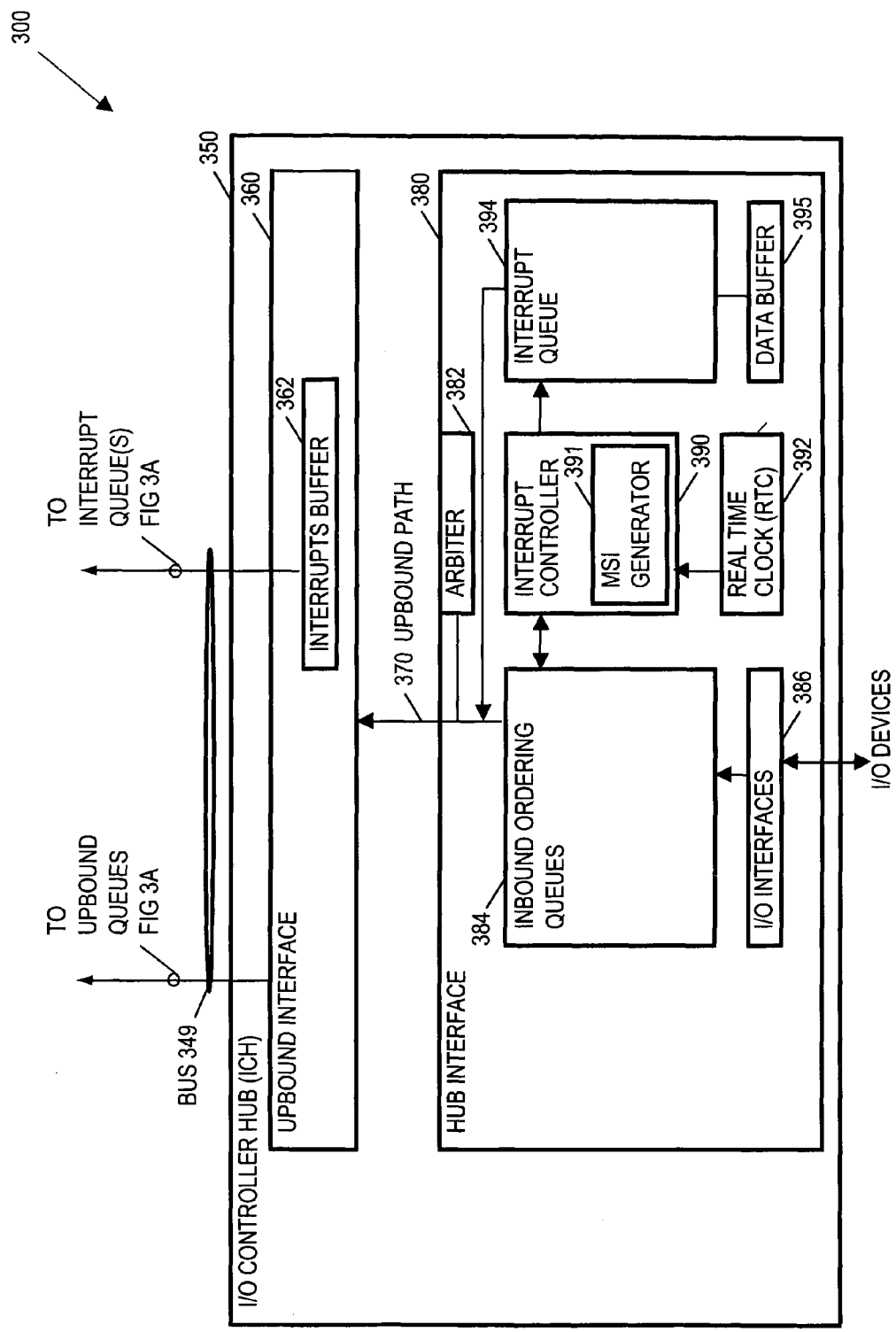

FIG. 3 depicts an embodiment of a chipset 300 to transmit an extended MSI transaction to a processor. For illustrative purposes, chipset 300 includes a MCH 310 and an ICH 350 and depicts primarily elements for transmitting a transaction such as an extended MSI transaction upbound toward a processor.

In the present illustration, extended MSI transactions are initiated in three locations: at I/O interfaces 386, real time clock 392, and graphics controller 320. These extended MSI transactions are forwarded from their respective origins to an interrupts buffer 314 in upbound interface 312 in MCH 310 where the transactions await availability of a bus to transmit to the processor. For clarity, the following discussion starts at I/O interfaces 386 and describes the progression of an extended MSI transaction toward interrupts buffer 314.

I/O interfaces 386 may be one or more interfaces for ICH 350 that receive extended MSI transactions from downstream devices such as single function devices, multifunction devices, remote systems loosely coupled via a PCI interface, slow devices, and the like. For instance, a single function system may include, e.g., a redundant array of independent discs (RAID) drive. The RAID drive may comprise a single controller or device function that is provided access by the OS to generate an interrupt. The extended MSI transaction advantageously facilitates inclusion of data related to the interrupt from the RAID drive so a processor does not have to request the data after receiving the interrupt.

Multifunction devices may comprise, e.g., a PCI bus controller. The PCI bus controller may poll, e.g., eight different devices on a PCI bus to check for interrupts from the individual devices. In some embodiments, multifunction devices can advantageously combine two or more of the interrupts into a single extended MSI transaction to decrease bandwidth requirements for servicing the interrupts of each of the individual devices and increase the number of interrupts that may be queued for service by a processor at one time. In particular, the data portion of the extended MSI transaction may comprise an indexed list of data for servicing various interrupts from the individual devices.

A remote system may comprise a computer such as computer 150 of FIG. 1, which may send interrupts to the processor. And a slow device may comprise, e.g., a mouse that generates an interrupt in response to pressing a button on the mouse. Inclusion of the data for the processor to service the interrupt significantly reduces latencies involved with accessing the remote system or slow device by the processor after the processor becomes available to service such interrupts.

Inbound ordering queues 384 of hub interface 380 receives the extended MSI transactions from I/O interfaces 386. Inbound ordering queues 384 order normal upbound traffic such as read and write accesses directed toward system memory via MCH 310.

Interrupt controller 390 identifies the extended MSI transactions and directs them into an interrupt queue 394, which is an ordering queue for transmitting the interrupts. Interrupts, which are inherently high priority transactions, may bypass ordering of inbound ordering queues 384 and are given priority over transactions in inbound ordering queues 384 by arbiter 382.

Interrupt controller 390 also couples with a real time clock (RTC) 392. RTC 392 maintains the time for processors. When RTC 392 generates interrupts periodically to update the time maintain locally by the processors, a MSI generator 391 generates extended MSI transactions in response to the interrupts. The data of the extended MSI transactions include the time indicated by RTC 392. Portions of the extended MSI transactions are placed in interrupt queue 394 and the data of the extended MSI transactions are placed in data buffer 395. In other embodiments, the size of entries in interrupt queue 394 may be large enough to store the entire extended MSI transaction.

Once an extended MSI transaction reaches the top of interrupt queue 394, arbiter 382 of hub interface 380 transmits the extended MSI transaction via upbound path 370 to interrupts buffer 362 of an upbound interface 360. Arbiter 347 gates transactions from the upbound interface 360 of ICH 350 based upon priorities associated with the transactions. As a result, arbiter 347 may transmit the extended MSI transaction via bus 349 to interrupt queues 335 of MCH 310 when space is available in interrupt queues 335. Upbound interface 360 of ICH 350 may transmit other inbound transactions to upbound queues 325.

In addition to receiving transactions from ICH 350, MCH 310 may receive direct memory accesses, processor requests, and extended MSI transactions via graphics controller 320. Graphics controller 320 may forward direct memory accesses to memory queue 340 to await access to the memory via memory interface 345. Graphics controller 320 may also route the processor requests and extended MSI transactions to upbound queues 325.

Interrupt controller 330 may identify the extended MSI transactions in upbound queues 325 and validate the extended MSI transactions via a validate function 332. Upon validating extended MSI transactions received at upbound queues 325, interrupt controller 330 may transfer the extended MSI transactions to interrupt queues 335.

Arbiter 334 may coordinate transference of transactions from upbound queues 325 and interrupt queues 335 to upbound interface 312 as transactions present in upbound interface transmit across a front-side bus via arbiter 305. More specifically, extended MSI transactions may move to an interrupts buffer 314 of upbound interface 312. In some embodiments, interrupts buffer 314 may be, e.g., 64 bytes wide to facilitate transmission across the front-side bus to a processor. In other embodiments, the interrupts buffer 314 may be another width based upon the maximum length of extended MSI transactions. Arbiter 336 may coordinate transactions that are directed towards the memory from the graphics device via graphics controller 320 and upbound queues 325.

In further embodiments some or all of the functionality of the chipset, buses, and/or other platform logic may be incorporated into a processor such as processor 200 of FIG. 2. For instance, a processor may incorporate logic to implement a portion or all of the functionality of MCH 310.

Figure 4:
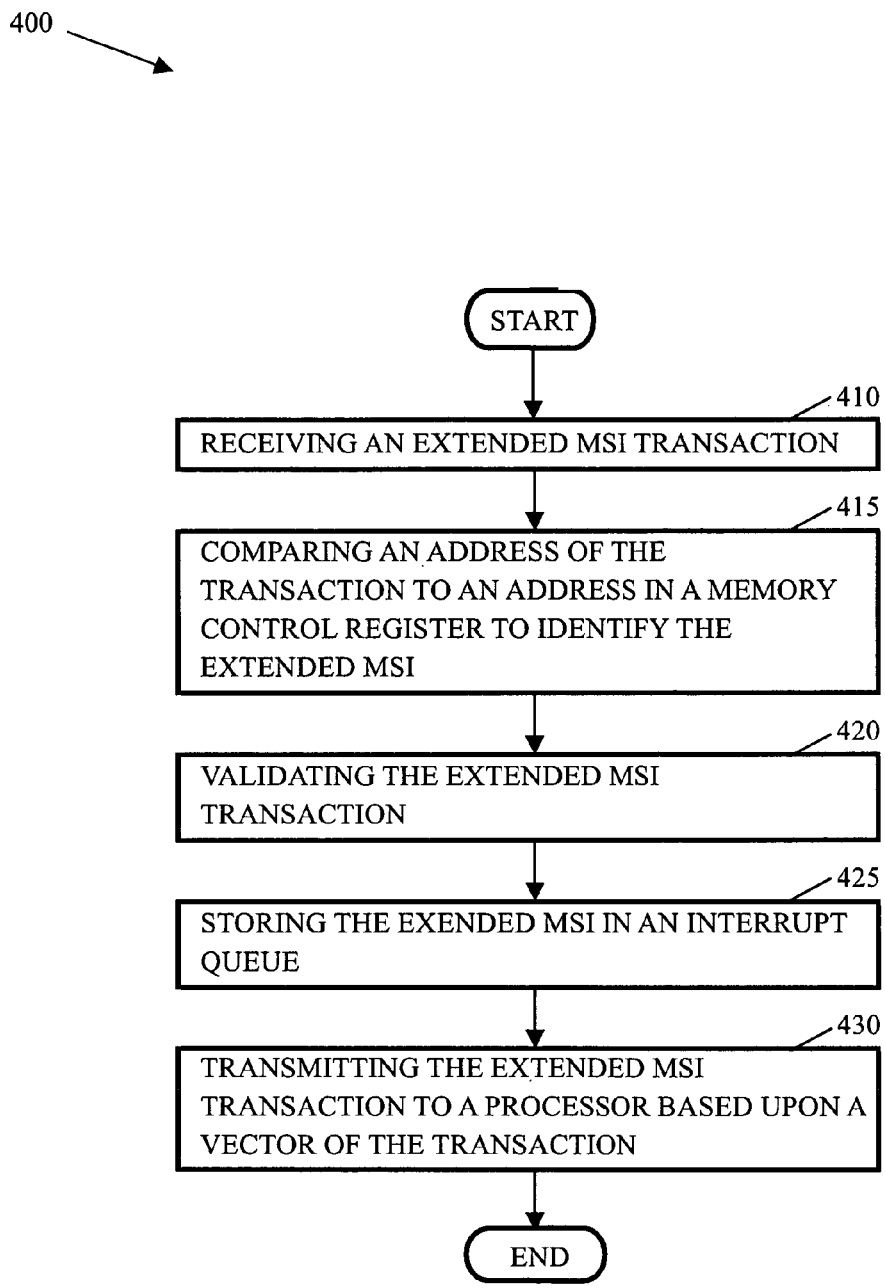
FIG. 4 depicts a flowchart of an embodiment to process an extended MSI transaction to reduce the latency associated with servicing interrupts.

FIG. 4 depicts a flowchart 400 of an embodiment to process an extended MSI transaction to reduce the latency associated with servicing MSIs. In particular, flowchart 400 describes functionality of a chipset such as chipset 300 in FIG. 3. Flowchart 400 begins with receiving an extended MSI transaction (element 410). For example, a MCH may receive an extended MSI transaction from a graphics accelerator card to refresh a video frame on a display.

Upon receipt of the extended MSI transaction, an interrupt controller of the MCH may compare an address of a vector included in the extended MSI transaction with an address of an address control register to identify the transaction as an MSI transaction (element 415). Then, the interrupt controller may determine the length of the extended MSI transaction. If the length is greater than four bytes but less than a minimum size for an extended MSI transaction such as six bytes, the interrupt controller may determine that the transaction is not a valid MSI transaction and not a valid extended MSI transaction. On the other hand, if the transaction is six bytes or larger, the interrupt controller may validate the extended MSI transaction (element 420) and store the extended MSI transaction in an interrupt ordering queue (element 425).

After validating the extended MSI transaction, the extended MSI transaction may progress to the top of the interrupt ordering queue. For instance, if the extended MSI transaction is received while two other MSI transactions in the interrupt ordering queue are awaiting transmission to the upbound interface, the extended MSI transaction may wait for those two MSI transactions to be forwarded to the upbound interface.

When the extended MSI transaction reaches the top of the interrupt ordering queue, the extended MSI transaction may be forwarded to the upbound interface to await transmission to a processor associated with the vector included in the extended MSI transaction (element 430). For example, if the vector designates physical processor one to process the extended MSI transaction, the transaction may wait at the upbound interface until processor one is available to receive the extended MSI transaction and the front-side bus is available to transmit the extended MSI transaction to the processor.

Figure 5:
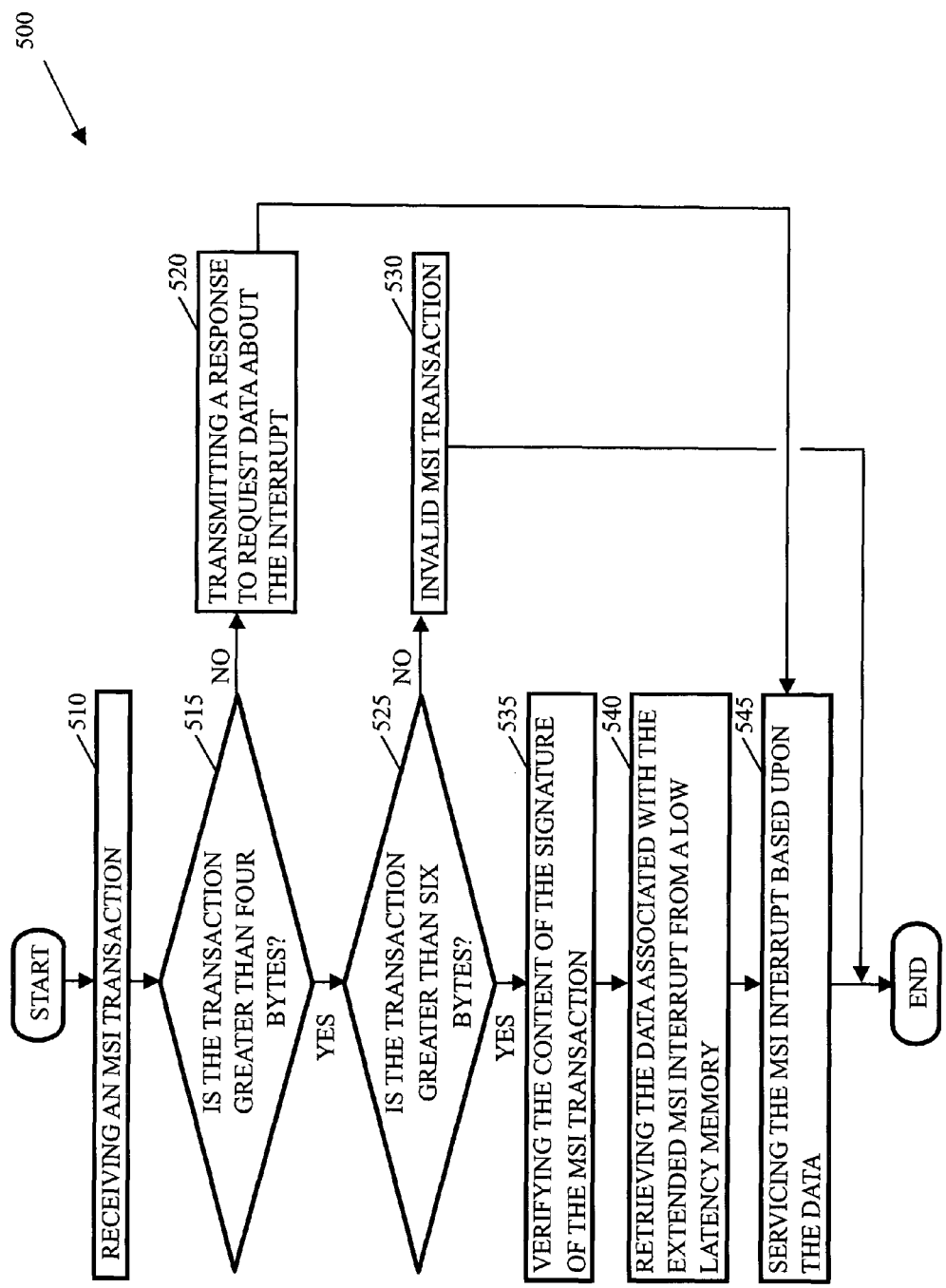
FIG. 5 depicts a flowchart of an embodiment to service an interrupt associated with an extended MSI transaction to reduce the latency associated with servicing interrupts.

Referring now to FIG. 5, there is shown a flowchart 500 of an embodiment to service an interrupt for associated with an extended MSI transaction to reduce the latency associated with servicing interrupts. Flowchart 500 may describe functionality of a processor such as processor 200 of FIG. 2 to service an extended MSI transaction. Flowchart 500 begins with receiving a MSI transaction from a chipset (element 510). The processor may then determine whether the MSI transaction is a legacy MSI transaction, an extended MSI transaction, or an invalid transaction. More specifically, the processor may determine if the MSI transaction is greater than four bytes (element 515). If the MSI transaction is a DWORD, then the processor may generate a response to the MSI transaction to retrieve data to service the interrupt from the device that originated the MSI transaction (element 520) and service the MSI transaction upon receipt of the data (element 540).

Otherwise, the processor may determine if the MSI transaction comprises greater than six bytes (element 525). When the MSI transaction has six bytes or less, the transaction is an invalid MSI transaction (element 530) so the transaction is discarded. In some embodiments, the invalidity of the MSI transaction may be reported back to the device and/or by other means. However, if the MSI transaction is greater than six bytes, the processor may verify that the signature included with the MSI transaction is valid to verify that the transaction is an extended MSI transaction (element 535).

After the extended MSI transaction is verified, the processor may store the data associated with the extended MSI transaction in a low latency memory. Then, when the processor is ready to service the extended MSI transaction, the data is retrieved from the low latency memory (element 540) and the processor may service the MSI based upon the data (element 545).

One embodiment of the invention is implemented as a program product for use with a computer system such as, for example, the system 100 shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., hard-disk drive or floppy disks within a diskette drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates systems and arrangements to extend message signal interrupt (MSI) transactions with additional data to reduce the latency associated with servicing the corresponding interrupts. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving, at a processor, a message signal interrupt initiated by a device, wherein the message signal interrupt comprises attributes, a vector, and data to service an interrupt, the attributes and the vector comprising a system-specified message and a system-specified address, wherein the data to service the interrupt comprises data to be processed by the processor to service the interrupt, the data to service the interrupt being sufficient to avoid further communication by the processor with the device for other data to service the interrupt;
storing, by the processor, the data in a buffer, wherein a latency associated with retrieval of the data from the buffer by the processor is lower than a latency associated with retrieval of the data from the device; and
retrieving, by the processor, the data from the buffer to service the interrupt.

2. The method of claim 1, further comprising servicing the interrupt based upon the data.

3. The method of claim 2, wherein servicing the interrupt based upon the data comprises interpreting the data to service the interrupt.

4. The method of claim 3, wherein interpreting the data comprises parsing the data to determine information to service the interrupt and other interrupts.

5. The method of claim 1, further comprising receiving the interrupt at a hub, creating the message signal interrupt based upon the interrupt, and transmitting the message signal interrupt to the processor.

6. The method of claim 5, wherein creating the message signal interrupt comprises producing the data based upon the interrupt and other interrupts, the data comprising a compilation of data to service the interrupt and the other interrupts.

7. The method of claim 1, wherein transmitting the message signal interrupt to the processor comprises storing the message signal interrupt in a queue, wherein an entry of the queue is sufficiently large to store the message signal interrupt.

8. The method of claim 1, wherein transmitting the message signal interrupt to the processor comprises storing the vector of the message signal interrupt in a queue and storing the data in a buffer associated with the queue.

9. The method of claim 1, wherein storing the data in the buffer comprises storing the data in a cache of the processor.

10. The method of claim 9, wherein storing the data in the cache of the processor comprises storing the data in an internal cache of the processor.

11. The method of claim 9, wherein storing the data in the cache of the processor comprises storing the data in an external cache of the processor.

12. The method of claim 1, wherein storing the data in the buffer comprises storing the data in an internal random access memory of the processor.

13. An apparatus comprising:
means for receiving, at a processor, a message signal interrupt initiated by a device, wherein the message signal interrupt comprises attributes, a vector, and data to service an interrupt, the attributes and the vector comprising a system-specified message and a system-specified address, wherein the data to service the interrupt comprises data to be processed by the processor to service the interrupt, the data to service the interrupt being sufficient to avoid further communication by the processor with the device for other data to service the interrupt;
means for storing, by the processor, the data in a buffer, wherein a latency associated with retrieval of the data from the buffer by the processor is lower than a latency associated with retrieval of the data from the device; and
means for retrieving, by the processor, the data from the buffer to service the interrupt.

14. The apparatus of claim 13, further comprising means for servicing the interrupt based upon the data.

15. The apparatus of claim 14, wherein the means for servicing the interrupt based upon the data comprises means for interpreting the data to service the interrupt.

16. The apparatus of claim 15, wherein the means for interpreting the data comprises means for parsing the data to determine information to service the interrupt and other interrupts.

17. The apparatus of claim 13, further comprising means for receiving the interrupt at a hub, creating the message signal interrupt based upon the interrupt, and transmitting the message signal interrupt to the processor.

18. The apparatus of claim 17, wherein the means for creating the message signal interrupt comprises means for producing the data based upon the interrupt and other interrupts, the data comprising a compilation of data to service the interrupt and the other interrupts.

19. The apparatus of claim 13, wherein the means for transmitting the message signal interrupt to the processor comprises means for storing the message signal interrupt in a queue, wherein an entry of the queue is sufficiently large to store the message signal interrupt.

20. The apparatus of claim 13, wherein the means for transmitting the message signal interrupt to the processor comprises means for storing the vector of the message signal interrupt in a queue and storing the data in a buffer associated with the queue.

21. The apparatus of claim 13, wherein the means for storing the data in the buffer comprises means for storing the data in a cache of the processor.

22. The apparatus of claim 21, wherein the means for storing the data in the cache of the processor comprises means for storing the data in an internal cache of the processor.

23. The apparatus of claim 21, wherein the means for storing the data in the cache of the processor comprises means for storing the data in an external cache of the processor.

24. The apparatus of claim 13, wherein the means for storing the data in the buffer comprises means for storing the data in an internal random access memory of the processor.

25. A system comprising:
   means for receiving, at a processor, a message signal interrupt initiated by a device, wherein the message signal interrupt comprises attributes, a vector, and data to service an interrupt, the attributes and the vector comprising a system-specified message and a system-specified address, wherein the data to service the interrupt comprises data to be processed by the processor to service the interrupt, the data to service the interrupt being sufficient to avoid further communication by the processor with the device for other data to service the interrupt;
   means for storing, by the processor, the data in a buffer, wherein a latency associated with retrieval of the data from the buffer by the processor is lower than a latency associated with retrieval of the data from the device;
   means for retrieving, by the processor, the data from the buffer to service the interrupt; and
   dynamic random access memory coupled with the means for receiving, at the processor, the message signal interrupt.

26. The system of claim 25, further comprising means for servicing the interrupt based upon the data.

27. The system of claim 26, wherein the means for servicing the interrupt based upon the data comprises means for interpreting the data to service the interrupt.

28. The system of claim 25, further comprising means for receiving the interrupt at a hub, creating the message signal interrupt based upon the interrupt, and transmitting the message signal interrupt to the processor.

* * * * *